(12) United States Patent
Haskara et al.

(10) Patent No.: US 8,532,911 B2
(45) Date of Patent: Sep. 10, 2013

(54) ADAPTIVE DIESEL ENGINE CONTROL FOR CETANE VARIATIONS

(75) Inventors: Ibrahim Haskara, Macomb, MI (US); Yue-Yun Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 679 days.

(21) Appl. No.: 12/712,140

(22) Filed: Feb. 24, 2010

(65) Prior Publication Data

US 2011/0208408 A1 Aug. 25, 2011

(51) Int. Cl.
- *B60T 7/12* (2006.01)
- *G05D 1/00* (2006.01)
- *G06F 7/00* (2006.01)
- *G06F 17/00* (2006.01)
- *F02B 5/00* (2006.01)

(52) U.S. Cl.
USPC ............................................ 701/105; 123/305

(58) Field of Classification Search
USPC ................. 701/103–105; 123/294, 299, 305, 123/435, 478, 501, 406.3, 406.31, 406.32; 73/35.02
See application file for complete search history.

(56) References Cited

U.S. PATENT DOCUMENTS

| | | | | |
|---|---|---|---|---|
| 4,397,285 A * | 8/1983 | O'Neill | | 123/502 |
| 4,549,815 A * | 10/1985 | Venkat et al. | | 374/8 |
| 6,463,907 B1 * | 10/2002 | Hiltner | | 123/304 |
| 7,360,525 B2 * | 4/2008 | Yamaguchi et al. | | 123/478 |
| 7,676,322 B1 * | 3/2010 | Kweon et al. | | 701/105 |
| 8,042,517 B2 * | 10/2011 | Nakajima | | 123/406.41 |
| 8,051,829 B2 * | 11/2011 | Kurtz et al. | | 123/305 |
| 8,150,596 B2 * | 4/2012 | Kweon et al. | | 701/103 |
| 2007/0055437 A1* | 3/2007 | Yamaguchi et al. | | 701/104 |
| 2010/0012089 A1* | 1/2010 | Nakajima | | 123/406.41 |

FOREIGN PATENT DOCUMENTS

WO WO 2009022595 A1 * 2/2009

* cited by examiner

*Primary Examiner* — Stephen K Cronin
*Assistant Examiner* — Sherman Manley
(74) *Attorney, Agent, or Firm* — John A. Miller; Miller IP Group, PLC

(57) ABSTRACT

A method and system for adaptively controlling a diesel engine to account for variations in the cetane number of the diesel fuel being used. An engine controller includes various control modules with algorithms for estimating the fuel cetane number, or determining the ignition delay that the engine is experiencing, or both. With this information, the controller can adjust the amount of exhaust gas recirculation that is used, thus varying the amount of oxygen that is available in the intake charge to burn the fuel. The controller can also adjust the timing of the fuel injection event, as another way of altering the nature of combustion. Using these techniques, the controller can optimize the engine operation based on the fuel currently being used.

15 Claims, 4 Drawing Sheets

ADAPTIVE DIESEL ENGINE CONTROL FOR CETANE VARIATIONS

BACKGROUND OF THE INVENTION

1. Field of the Invention

This invention relates generally to an adaptive diesel engine controller and, more particularly, to a method and system for adaptively controlling injection timing and other parameters in a diesel engine to compensate for variations in fuel cetane number.

2. Discussion of the Related Art

Diesel engines are well known for their fuel economy advantages over spark ignition engines. Diesel engines have become a popular engine choice in passenger cars and light-duty trucks, in addition to their long-standing use in medium-duty and heavy-duty trucks. Modern diesel engines are quieter and easier to start than their predecessors, and also produce less soot and other objectionable emissions. These factors have further increased the appeal of diesel engines to the drivers of everyday vehicles like passenger cars and light trucks.

While diesel engines have gained in popularity, variations in diesel fuel type and quality have proliferated. This proliferation is due to a variety of factors—including temporary or regional petroleum shortages which necessitate the use of lower quality petroleum-based diesel fuels, and an increase in usage of biodiesel fuel and petroleum-biodiesel blends. As a result of these factors, a driver may find that the only diesel fuel available when needed has a lower or higher cetane number than that which is recommended. Variations in cetane number, which measures the ignitability of a diesel fuel, can cause problems with engine performance, efficiency, and emissions, among other undesirable effects.

A vehicle system which can adapt to variations in diesel fuel cetane number would provide a significant benefit to the vehicle owner. Not only could such a system adjust an engine's operating parameters in real time to optimize performance, efficiency, and emissions regardless of fuel cetane number, but the system could free the driver from worrying about what type of fuel can or cannot be put in the vehicle.

SUMMARY OF THE INVENTION

In accordance with the teachings of the present invention, a method and system are disclosed for adaptively controlling a diesel engine to account for variations in the cetane number of the fuel being used. The system includes an engine controller having various modules with algorithms for estimating the fuel cetane number, or determining the ignition delay that the engine is experiencing, or both. With this information, the controller can adjust the amount of exhaust gas recirculation that is used, thus varying the amount of oxygen that is available in the intake charge to burn the fuel. The controller can also adjust the timing of the fuel injection event, as another way of altering the nature of combustion. Using these techniques, the controller can optimize the engine operation based on the fuel currently being used.

Additional features of the present invention will become apparent from the following description and appended claims, taken in conjunction with the accompanying drawings.

DETAILED DESCRIPTION OF THE EMBODIMENTS

Figure 1:
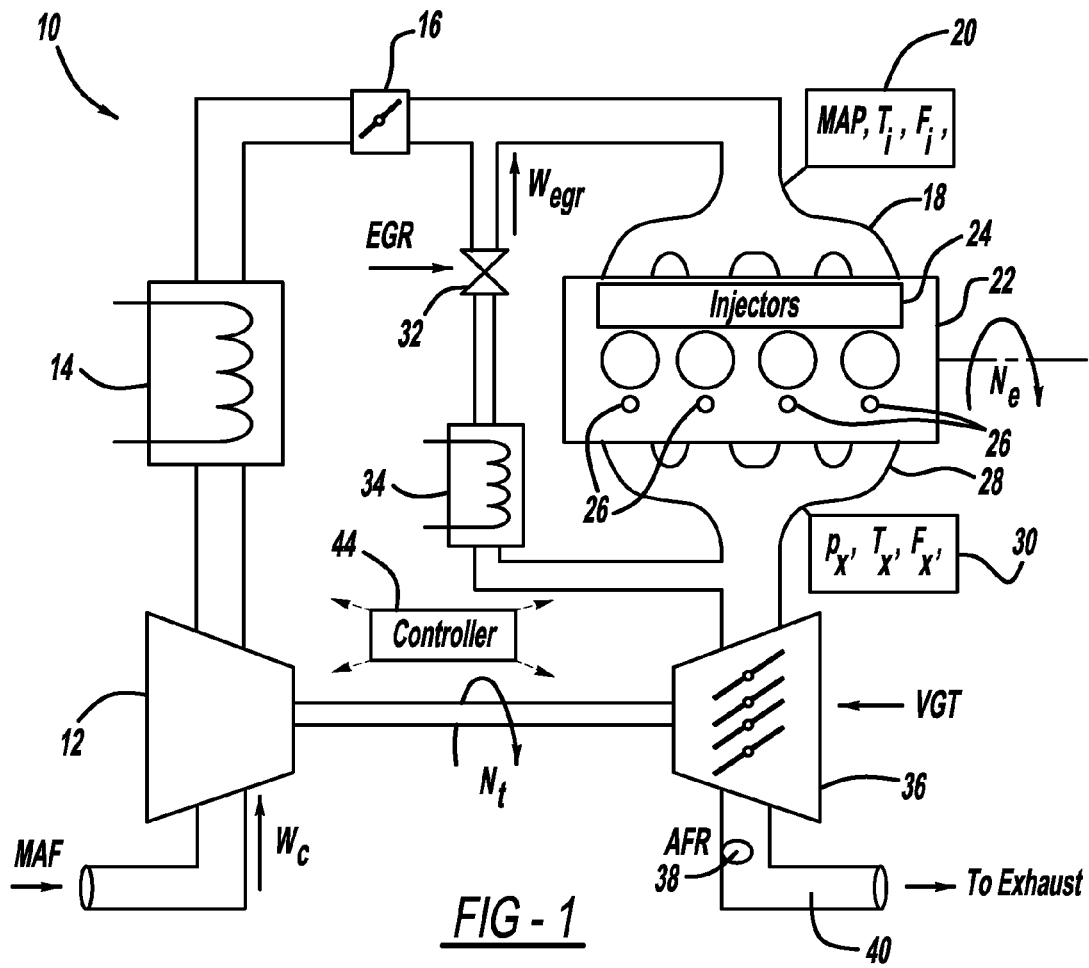
FIG. 1 is a schematic diagram of a turbo-charged diesel engine.

The following discussion of the embodiments of the invention directed to a method and system for adaptively controlling a diesel engine is merely exemplary in nature, and is in no way intended to limit the invention or its applications or uses.

While diesel engines have become increasingly popular in passenger cars and light-duty trucks in recent years, variations in the type and quality of available diesel fuels have also increased. The spectrum of diesel fuel options includes many different formulations of petroleum-based diesels (petrodiesels), which can vary from high cetane number paraffins to low cetane number aromatics. Also available are biologically-based diesel fuels (biodiesels) and petrodiesel-biodiesel blends. This wide variety of fuel formulations can cause problems for vehicle owners if the cetane number of the fuels varies significantly.

Cetane number (CN) is a measurement of the combustion quality of diesel fuel during compression ignition. Specifically, cetane number is a measure of a fuel's ignition delay, which is the time period between the start of injection and start of combustion (ignition) of the fuel. In a particular diesel engine, higher cetane fuels will have shorter ignition delay periods than lower cetane fuels. Cetane numbers are only used for the relatively light distillate diesel oils, and for biodiesel fuels. Generally, diesel engines run well with a CN from 40 to 55. Fuels with a higher cetane number which have shorter ignition delays provide more time for the fuel combustion process to be completed. Hence, higher speed diesels operate more effectively with higher cetane number fuels. There is no performance or emission advantage when the CN is raised past approximately 55; after this point, the fuel's performance hits a plateau. The cetane number of a fuel can be measured by burning the fuel in a special variable-compression-ratio diesel engine known as the Cooperative Fuel Research (CFR) engine. Cetane number can also be determined using a test apparatus known as the Ignition Quality Tester.

Most automotive diesel engines are designed to operate on fuels with a mid-range cetane number of about 46. While such engines can usually run on fuels with a cetane number down to about 40, these low-CN fuels cause problems due to their high ignition delay. These problems include poor engine performance, decreased fuel efficiency, and increased emissions. Likewise, a typical diesel engine can run fine on fuels with a cetane number above 50. But these high-CN fuels can also present a problem in that the short ignition delay leads to higher peak combustion temperatures, which increases the formation of oxides of nitrogen (NOx), an undesirable component of emissions.

The present invention provides a solution to the problem of cetane number variation from fuel to fuel, in the form of a controller which can adaptively respond to these variations by modifying certain engine input parameters. The controller can respond to low-CN fuels by increasing the amount of oxygen in the intake charge, or by advancing the timing of fuel injection, or both, to achieve the desired combustion characteristics. The controller can also modify the input parameters inversely in response to high-CN fuel usage. Neither oxygen concentration nor injection timing alone is sufficient to optimize the combustion process under all conditions, therefore it is advantageous to employ a control strategy which is able to adjust both of these parameters in response to fuel cetane number and other factors.

FIG. 1 is a schematic diagram of a typical turbo-charged 4-cylinder diesel engine 10. Intake air passes through a turbocharger compressor 12 and a charge air cooler 14 before reaching a throttle valve 16. The intake air flows to an intake manifold 18, which is equipped with sensors 20 for measuring various parameters, such as pressure and temperature. The intake air then flows into cylinders 22, where fuel injectors 24 inject fuel into the cylinders 22 to be burned. Each cylinder 22 is fitted with a pressure sensor 26, which can be integrated with a glow plug (not shown) that is needed for each cylinder 22. Exhaust gases flow to an exhaust manifold 28, which is equipped with sensors 30. Some exhaust gas may be diverted back to the intake air stream by way of an exhaust gas recirculation (EGR) valve 32 and an EGR cooler 34. The remainder of the exhaust gas passes through a variable geometry turbine (VGT) 36, which drives the compressor 12. The exhaust gas finally flows past an Air-Fuel Ratio (AFR) sensor 38 and out through an exhaust pipe 40. An engine controller 44 is connected to many of the elements of the engine 10. For example, the controller 44 receives feedback from the sensors 20, 26, 30, and 38, and is used to control the fuel injectors 24 and the EGR valve 32.

A first embodiment of the present invention includes a process for estimating the cetane number of the fuel currently being used, and using the estimated cetane number to adjust either the EGR valve 32, the start of injection (SOI) timing, or both. Estimating the cetane number of the current fuel can be done during vehicle deceleration, when no engine power is being called for by the driver. Under these conditions, the engine controller 44 can command the injectors 24 to skip some injection cycles. This allows the controller 44 to compare a pressure ratio average (PRA) for the fired cycles to a PRA for the non-fired cycles, using cylinder pressure data from the pressure sensors 26. Pressure ratio average is a measurement of pressure in the cylinder 22 over a complete compression/combustion cycle. The PRA for non-fired cycles will reflect simple motoring compression, and the PRA for fired cycles will vary in a predictable fashion based on the cetane number of the fuel. Using a pre-determined correlation function $f$, the controller 44 can calculate an indicated cetane number for the current detection event based on the pressure ratio averages for the fired and non-fired cycles, as shown in Equation (1). The controller 44 can then calculate an estimated cetane number for the current fuel, using the indicated cetane number from Equation (1) in a weighting function with the previous estimated cetane number, as shown in Equation (2).

$$CN_{ind,k} = f\left(\frac{\Sigma_{over\ fired\ cycles} PRA_i}{\#\ of\ fired\ cycles} - \frac{\Sigma_{over\ non-fired\ cycles} PRA_i}{\#\ of\ non-fired\ cycles}\right) \quad (1)$$

$$CN_{est,k} = a^* CN_{ind,k} + (1-a)^* CN_{est,k-1} \quad (2)$$

where, $CN_{ind,k}$ is average cetane number indicator per detection event (k: detection event index), $PRA_i$ is pressure-ratio-average for a given combustion cycle (i: combustion cycle index), f is correlation between PRA and $CN_{ind}$, a is filter time constant (forgetting factor) and $CN_{est,k}$ is cetane number estimate (between $k_{th}$ and $(k+1)_{th}$ detection event).

Figure 2:
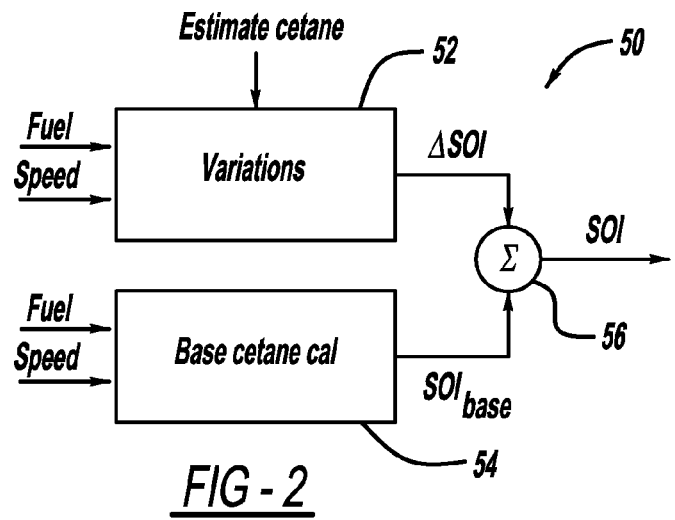
FIG. 2 is a block diagram of a first module in an engine controller that adjusts injection timing based on estimated fuel cetane number.

The estimated cetane number of the fuel can be used by the controller 44 in a feed-forward mode to adjust either the timing of the start of injection (SOI), or the amount of exhaust gas recirculation (EGR) to mix with intake air, or both. FIG. 2 is a block diagram of a module 50 of the controller 44, showing how the estimated cetane number of the current fuel can be used to adjust the SOI timing. At box 52, the estimated cetane number of the current fuel is used to calculate an adjustment $\Delta SOI$ to the SOI timing. This calculation is based on the current fuel demand and engine speed, along with the estimated cetane number of the fuel, and is a function of the amount the cetane number varies from the base cetane number as shown in Equation (3). Base SOI timing is retrieved from a calibration table at box 54, and this base SOI timing is also a function of current fuel demand and engine speed. As shown in FIG. 2 and Equation (4), the adjustment $\Delta SOI$ to the SOI timing (which could be positive or negative) is added to the base SOI timing at summation function 56 to obtain the injection timing SOI to be used by the fuel injectors 24.

$$\Delta SOI \propto \frac{CN_{est,k} - CN_{base}}{CN_{high} - CN_{low}} \quad (3)$$

$$SOI = SOI_{base} + \Delta SOI \quad (4)$$

Figure 3:
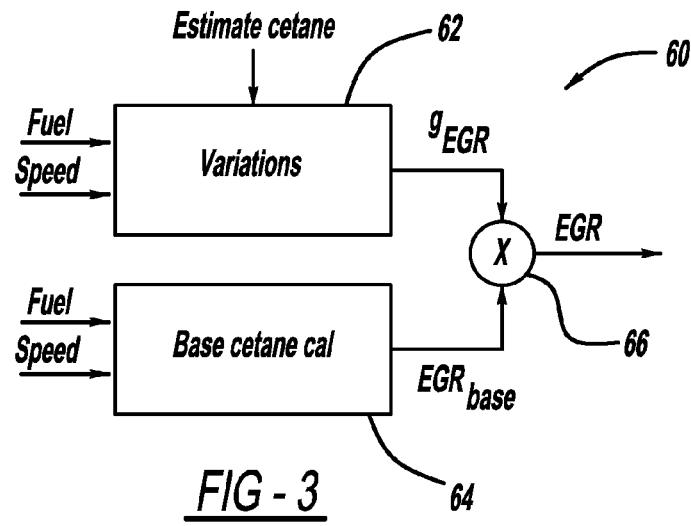
FIG. 3 is a block diagram of a second module in an engine controller that adjusts exhaust gas recirculation based on estimated fuel cetane number.

FIG. 3 is a block diagram of a module 60 of the controller 44, showing how the estimated cetane number of the current fuel can also be used to adjust the amount of exhaust gas recirculation (EGR) to mix with intake air. At box 62, the estimated cetane number of the current fuel is used to calculate an adjustment factor $g_{EGR}$ for the EGR. This calculation is based on the current fuel demand and engine speed, along with the estimated cetane number of the fuel, and is a function of the amount the cetane number varies from the base cetane number as shown in Equation (5). Base EGR quantity is retrieved from a calibration table at box 64, and this base EGR quantity is also a function of current fuel demand and engine speed. As shown in FIG. 3 and Equation (6), the adjustment factor $g_{EGR}$ is multiplied with the base EGR quantity at product function 66 to obtain the quantity EGR to be used by the EGR valve 32.

$$g_{EGR} \propto \frac{CN_{est,k} - CN_{base}}{CN_{high} - CN_{low}} \quad (5)$$

$$EGR = g_{EGR} * EGR_{base} \quad (6)$$

The figures and calculations described above allow the controller 44 to adjust either the start of injection timing or the exhaust gas recirculation amount, based on the estimated cetane number of the current fuel. Another variation of this embodiment, still using the estimated cetane number, is to calculate a target oxygen concentration in the intake air stream, and use this target oxygen concentration along with an estimated oxygen concentration feedback value to adjust the EGR valve 32 in real time. For these purposes, it is useful to have a relationship between ignition delay, cetane number, and oxygen concentration. Such a relationship, based on empirical data, is given in Equations (7) and (8) below.

$$\tau_{ign} = Ap^{-n}\exp\left(\frac{E_a}{RT}\right)[O_2]^{-b} \quad (7)$$

$$E_a = \frac{g}{CN+h} \quad (8)$$

Where $E_a$ is apparent activation energy—which decreases with increasing fuel cetane number, R is the universal gas constant, p, T are pressure and temperature at the time of ignition, $[O_2]$ is intake oxygen concentration and A, n, b, h, g are calibration constants.

Using the ignition delay relationships of Equations (7) and (8), it is possible to define the feed-forward correction strategy described previously, by changing oxygen concentration to maintain the same ignition delay for varied cetane number. Applying a small signal analysis around an operating point yields Equations (9) and (10).

$$\tau_{ign} = f(CN, [O_2]) \approx f(CN + \delta_{CN}, [O_2] + \delta_{O_2}) \quad (9)$$

$$\delta_{O_2} = -\left(\frac{g}{bRT(CN+h)^2}\delta_{CN}\right)[O_2] \quad (10)$$

Figure 4:
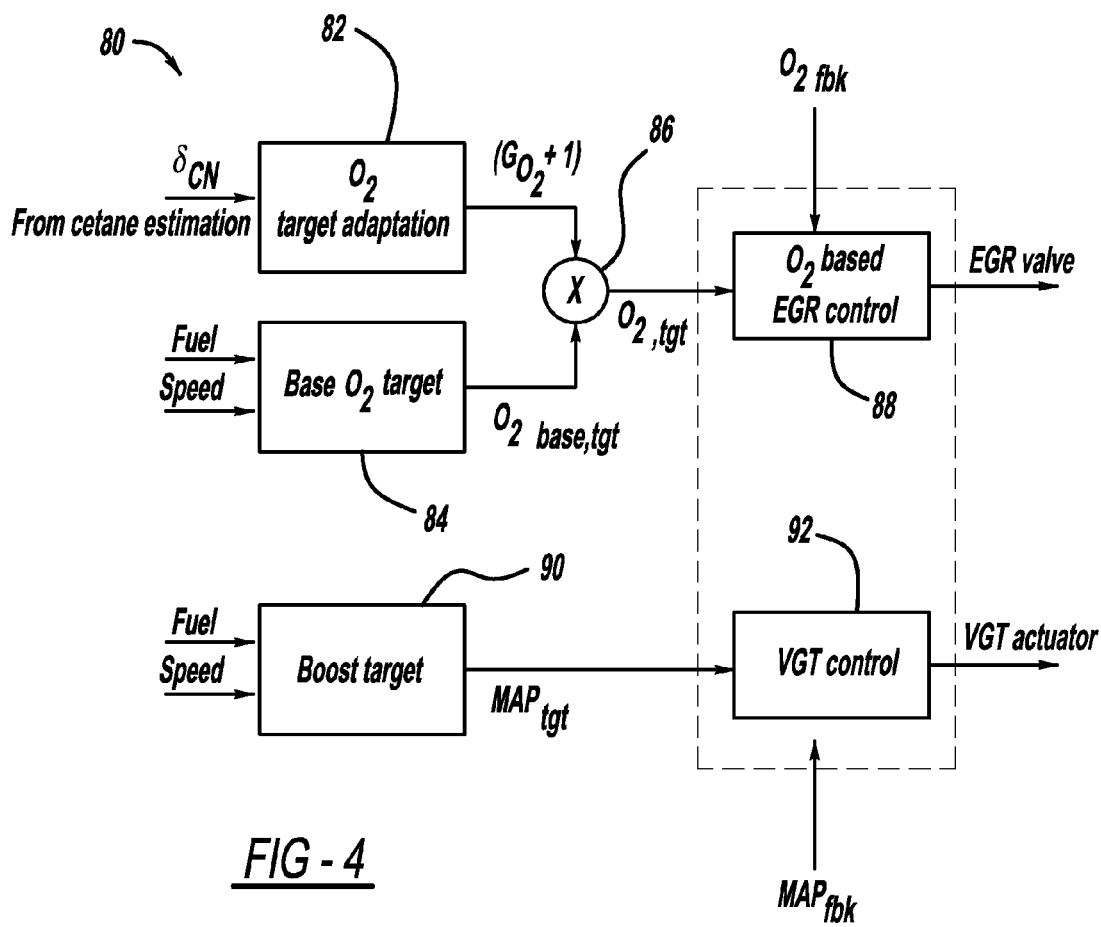
FIG. 4 is a block diagram of a third module in an engine controller that controls a turbocharger actuator and an exhaust gas recirculation valve based on estimated fuel cetane number.

Equation (10) can be used to determine an appropriate oxygen concentration adjustment to apply in response to a certain variance in fuel cetane number. FIG. 4 is a block diagram of a module 80 of the controller 44 which can be used to control the entire intake air stream, including both the turbocharger boost pressure and the oxygen concentration. At box 82, an oxygen concentration factor $G_{O_2}$ is computed as a function of $\delta_{CN}$, which is the amount that the estimated current cetane number varies from the base cetane number. This calculation is shown in Equation (11) below, which is a variant of Equation (10) explained above. It is noted that when $\delta_{CN}$ is positive, that is the current fuel has a cetane number higher than the base cetane number, the value of $G_{O_2}$ is negative; and vice versa.

$$G_{O_2} = -\left(\frac{g}{bRT_{int}(CN+h)^2}\delta_{CN}\right) \quad (11)$$

Where R is the universal gas constant, $T_{int}$ is the intake air temperature, CN is the base cetane number, $\delta_{CN}$ is the variance of the current cetane number from the base cetane number, and b, h, g are calibration constants.

The output of the box 82 is the value $(G_{O_2}+1)$, which is multiplied by a base oxygen concentration target from box 84, at the product function 86. This produces a target oxygen concentration, which can be compared to an estimated feedback oxygen concentration value at box 88. The output of the box 88 is used to control the EGR valve 32 as follows. If the target oxygen concentration is greater than the estimated feedback oxygen concentration at the box 88, then the EGR valve 32 is commanded to move to a more closed position, thus resulting in a lower fraction of EGR in the intake air stream, and increasing the oxygen concentration. Adjustment of the EGR valve 32 continues in a closed-loop control fashion so as to drive the error between the target oxygen concentration and the estimated feedback oxygen concentration to zero. The estimated feedback oxygen concentration value at the box 88 is obtained through calculations using the Air-Fuel Ratio and the percentage of exhaust gas recirculation being used in the intake air stream. These calculations are based on fundamental physical principles, are known in the industry, and will not be detailed here.

Boxes 90 and 92 in FIG. 4 represent the control blocks for the turbocharger. The box 90 computes a target boost pressure, or Manifold Absolute Pressure (MAP), based on fuel demand and engine speed. The target MAP is used in the box 92 along with a feedback MAP signal from the sensors 20. The output of the box 92 is a control signal to the variable geometry turbine 36, commanding the turbine 36 to adjust so as to either increase or decrease boost pressure with the compressor 12.

Figure 5:
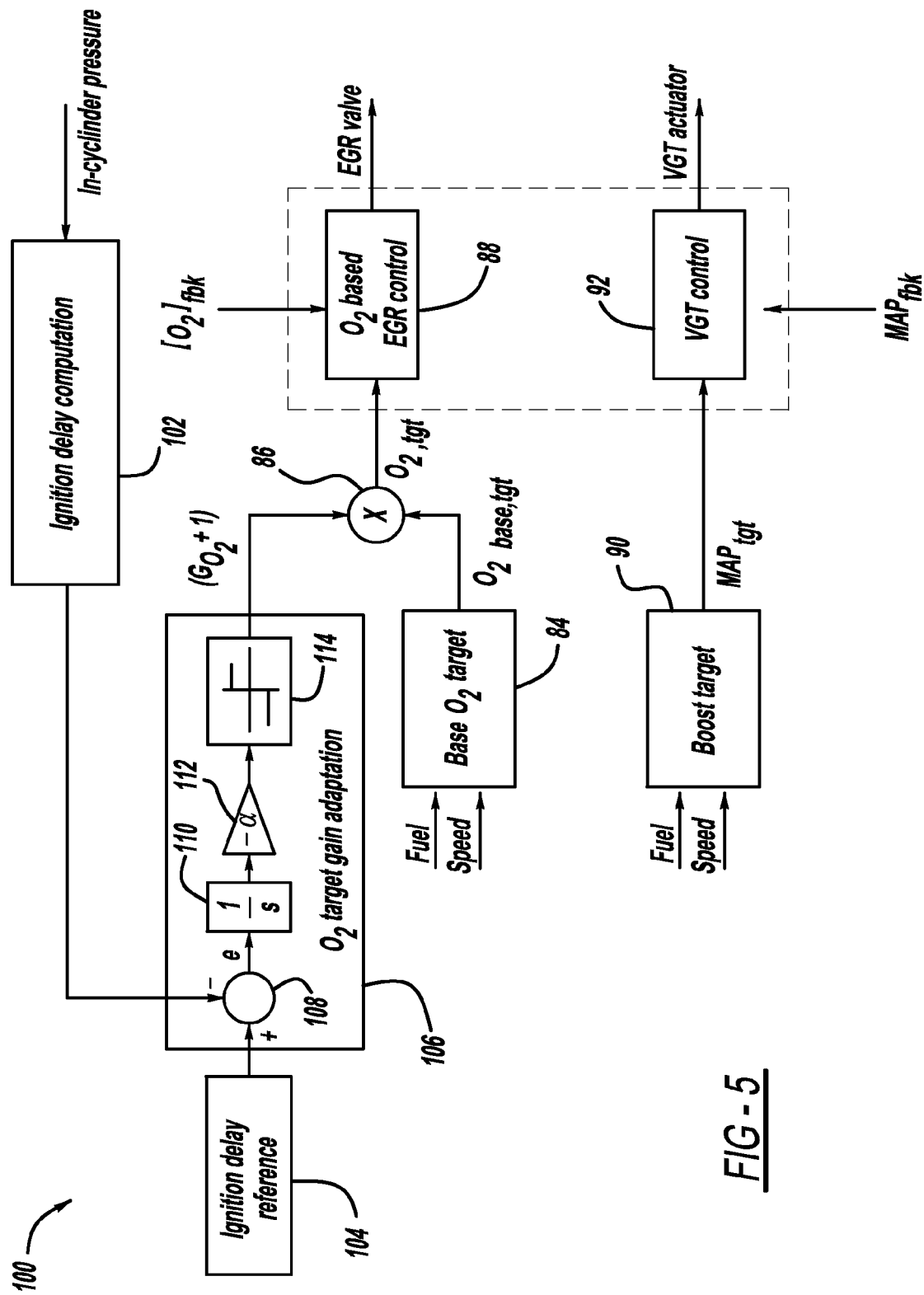
FIG. 5 is a block diagram of a fourth module in an engine controller that controls a turbocharger actuator and an exhaust gas recirculation valve based on measured ignition delay.

The embodiments described above all use an estimated fuel cetane number to adjust engine input parameters in order to achieve the desired combustion characteristics. It is also possible to directly monitor ignition delay in the engine 10, and use this ignition delay information to adjust engine input parameters. FIG. 5 is a block diagram of a module 100 of the controller 44 which can be used to adjust the EGR valve 32, and hence the intake oxygen concentration, based on the ignition delay actually being exhibited by the engine 10. The module 100 is a modification of the module 80 shown in FIG. 4 in that the box 82, which in the module 80 computed an adjustment factor for the oxygen concentration based on cetane number variation from a base value, is replaced in the module 100 with an oxygen concentration adjustment calculation based on ignition delay. Other elements of the module 100 retain their reference numbers as used in the module 80.

At box 102, the actual ignition delay exhibited in the engine 10 is computed based on feedback from the cylinder pressure sensors 26. Ignition delay in any cylinder is calculated as the time elapsed between the start of injection, which is known, and the start of combustion, which can be determined from the cylinder pressure sensor 26. Start of combustion can be defined in any way suitable for the purpose—such as the point at which 1% of the heat energy of the fuel has been released. In any definition of start of combustion, the rapid rate of change of cylinder pressure makes the start of combustion readily identifiable. As explained, the box 102 provides a computed actual ignition delay. Box 104 provides an ignition delay reference—that is, the desired ignition delay under the current engine operating conditions. The actual and reference ignition delay values are fed into box 106. The function of the box 106 is to compute a multiplication factor $G_{O_2}$, which can be used to adjust the target oxygen concentration, and to do so based on the ignition delay data from the boxes 102 and 104. The first element of the box 106 is a summation function 108, which generates an error signal equal to the difference between the reference ignition delay and the computed ignition delay. This error signal passes to an integrator 110, and the integrated signal is then multiplied by a negative adaptation gain constant $\propto$ at gain block 112. The sign change is used to create a multiplication factor $G_{O_2}$ which is negative (which will lead to a reduction of oxygen concentration) when the ignition delay error signal is positive (meaning that the actual ignition delay is less than the reference ignition delay). Finally in the box 106, the output of the gain block 112 is passed through a saturation limit 114, which limits the value of $G_{O_2}$ to a maximum magnitude, whether positive or negative.

As was the case with the box 82 in the module 80, the output of the box 106 is the value ($G_{O_2}$+1), which can be multiplied by the base oxygen concentration target at the product function 86. The remainder of the module 100, including the elements 84, 86, 88, 90, and 92, operate as described previously for the module 80, ultimately controlling both the EGR valve 32 and the boost pressure via the turbine 36.

Figure 6:
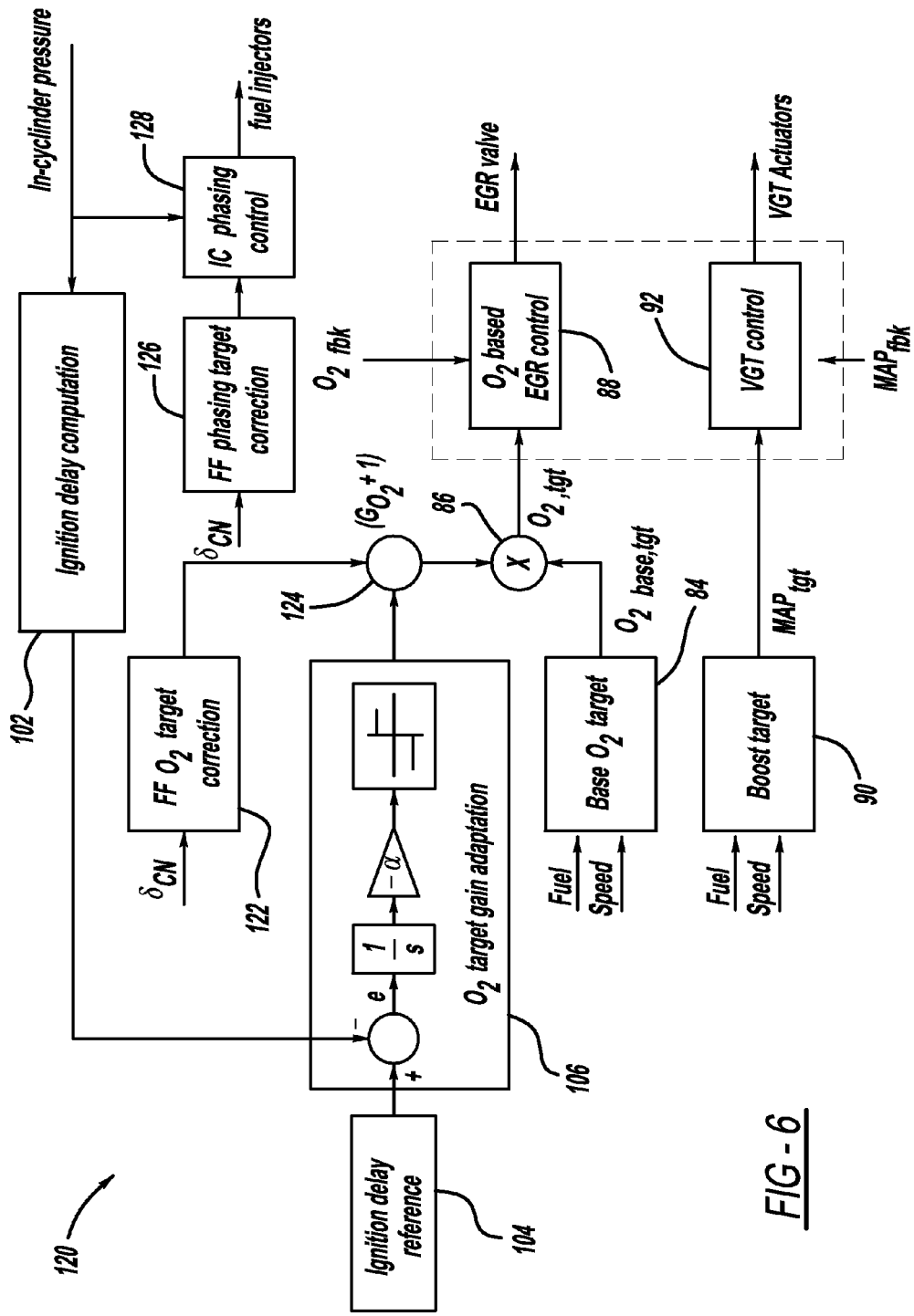
FIG. 6 is a block diagram of a fifth module in an engine controller that controls a turbocharger actuator and an exhaust gas recirculation valve based on estimated fuel cetane number, measured ignition delay, and combustion phasing.

FIG. 6 is a block diagram of a module 120 of the controller 44. The module 120 embodies an overall adaptive engine control strategy including both cetane number estimation and ignition delay measurement. Many elements of the module 120 are the same as those in the module 100 described previously, including the boost pressure target and turbocharger controller boxes 90 and 92, the base oxygen concentration target box 84, the product function 86, the $O_2$ based EGR controller 88, and the ignition delay-based $O_2$ target adaptation boxes 102, 104, and 106. However, the module 120 adds other functions to the control strategy. Box 122 is a feed-forward oxygen concentration target adjustment based on estimated cetane number. The box 122 operates in the same way as the box 82 in the module 80—that is, based on the estimated cetane number of the fuel being used it provides a multiplier slightly greater than or less than the number 1, to be used to adjust oxygen concentration. The output of the box 122 is multiplied at product function 124 by the output of the ignition delay-based oxygen concentration adaptation box 106, to provide an overall oxygen concentration adjustment factor. This overall oxygen concentration adjustment factor is multiplied at the product function 86 by the base oxygen concentration target from the box 84, and the result is used at the box 88 to control the EGR valve 32.

The module 120 also adds a two-step adjustment to start of injection (SOI) timing. Box 126 is a feed-forward SOI timing correction based on estimated fuel cetane number. The box 126 operates in the same way as the module 50 described previously—that is, it adjusts the start of injection timing based on the difference in fuel cetane number from a base value, where SOI timing is advanced for low-CN fuels and retarded for high-CN fuels. The SOI output of the box 126 is passed to an individual cylinder phasing control at box 128, which makes a further adjustment to SOI timing for each cylinder based on cylinder pressure data from the sensors 26. Specifically, the cylinder pressure data is used to determine combustion phasing, which is defined as the crank angle position at which a certain percentage of the fuel in a particular cylinder has been burned. For example, a combustion phasing value denoted as $CA_{50}$ would represent the crank angle position, in degrees past top dead center, at which 50% of a cylinder's fuel has been burned. Combustion phasing is a very important performance parameter in that it is defined in absolute terms with respect to crank position, whereas ignition delay is a time-based parameter that is relative to start of injection timing. It is possible to determine combustion phasing from cylinder pressure data by analyzing both the pressure itself and the rate of change of pressure. Testing has shown that the timing of maximum heat release during a cylinder burn event correlates very closely with $CA_{20}$, or the crank angle at which 20% of the cylinder's fuel has been burned. This and other analysis techniques make it possible to determine the combustion phasing for various burn percentages of interest. A control strategy can then be employed to optimize combustion phasing by adjusting SOI timing. For example, a control strategy could be defined to keep $CA_{50}$ within a certain range of crank angle positions, which would be done by advancing SOI timing if $CA_{50}$ is occurring too late, and vice versa. The output of the box 128 is the SOI timing which is used to control the fuel injectors 24.

As described in this embodiment, the module 120 provides complete adaptive control of the engine 10, including management of the turbocharger boost, exhaust gas recirculation, and injection timing functions. These controls are based on the estimated cetane number of the fuel currently being used, as well as the actual ignition delay and combustion phasing being experienced. Using combustion phasing on an individual cylinder basis as a final factor to adjust injection timing, while using ignition delay as a final factor to adjust exhaust gas recirculation, provides the most powerful and flexible control of engine performance. The control strategy is adapted to optimize engine performance across a range of fuel cetane numbers, using both of the input controls necessary for complete management of the combustion process, namely oxygen concentration and injection timing.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling combustion in a diesel engine, said method comprising: running the engine with a fuel of an unknown cetane number; estimating the cetane number of the fuel based on engine performance data and ignition delay, including estimating the cetane number during engine deceleration conditions by skipping fuel injection on some cycles in some cylinders, computing pressure ratios for cycles with fuel injection and cycles without fuel injection, and comparing the pressure ratios; using the estimated cetane number in a controller to make adjustments to engine inputs to improve combustion in the engine; and computing a combustion phasing value for each cylinder using cylinder pressure data during engine operation and using the combustion phasing value to adjust start of injection timing, where the combustion phasing value is defined as the crank angle position at which a certain percentage of the fuel in a particular cylinder has been burned.

2. The method of claim 1 wherein making adjustments to engine inputs to improve combustion in the engine includes adjusting start of injection timing.

3. The method of claim 1 wherein making adjustments to engine inputs to improve combustion in the engine includes adjusting exhaust gas recirculation usage.

4. The method of claim 3 wherein adjusting exhaust gas recirculation usage includes using an oxygen concentration target value and an oxygen concentration feedback value to adjust an exhaust gas recirculation valve.

5. The method of claim 4 wherein making adjustments to engine inputs to improve combustion in the engine includes adjusting start of injection timing.

6. A method for controlling combustion in a diesel engine, said method comprising: running the engine with a fuel of an unknown cetane number; estimating the cetane number of the fuel during engine deceleration conditions by skipping fuel injection on some cycles in some cylinders, computing pressure ratios for cycles with fuel injection and cycles without fuel injection, and comparing the pressure ratios;

determining an actual ignition delay being experienced by the engine by calculating the elapsed time between a start of fuel injection into a cylinder of the engine and a start of combustion;

using the estimated cetane number, the actual ignition delay and a reference ignition delay in a controller to make adjustments to engine inputs to improve combustion in the engine; and computing a combustion phasing value for each cylinder using cylinder pressure data during engine operation and using the combustion phasing value to adjust start of injection timing, where the combustion phasing value is defined as the crank angle position at which a certain percentage of the fuel in a particular cylinder has been burned.

7. The method of claim 6 wherein computing an actual ignition delay being experienced by the engine includes using cylinder pressure data to detect when combustion begins.

8. The method of claim 6 wherein making adjustments to engine inputs to improve combustion in the engine includes using an oxygen concentration target value and an oxygen concentration feedback value to adjust an exhaust gas recirculation valve.

9. The method of claim 6 further comprising wherein making adjustments to engine inputs to improve combustion in the engine includes using the estimated cetane number to adjust start of injection timing.

10. A system for controlling combustion in a diesel engine, said system comprising: a plurality of sensors for measuring conditions at various locations in the engine; fuel injectors with an adjustable injection timing capability; an adjustable exhaust gas recirculation valve; and a controller for monitoring data from the sensors and making adjustments to the engine in order to improve combustion characteristics, said controller being configured to determine an ignition delay time in at least one cylinder in the engine by calculating the elapsed time between a start of fuel injection into the cylinder and a start of combustion and estimating a fuel cetane number based on the ignition delay, said controller also being configured to estimate a fuel cetane number during engine deceleration conditions by skipping fuel injection on some cycles in some cylinders, computing pressure ratios for cycles with fuel injection and cycles without fuel injection, and comparing the pressure ratios, said controller further being configured to calculate a combustion phasing value for each cylinder based on cylinder pressure data from the sensors and use the combustion phasing value to adjust start of injection timing by the fuel injectors.

11. The system of claim 10 wherein the controller uses the estimated fuel cetane number to adjust start of injection timing by the fuel injectors.

12. The system of claim 10 wherein the controller uses the estimated fuel cetane number to adjust the exhaust gas recirculation valve to achieve a desired intake oxygen concentration.

13. The system of claim 10 wherein one of the sensors is a pressure sensor that measures the pressure in an engine cylinder, said controller using the pressure measurement to determine the start of combustion.

14. The system of claim 10 wherein the controller uses the ignition delay time to adjust a target oxygen concentration value, and uses the target oxygen concentration value and an oxygen concentration feedback value to adjust the exhaust gas recirculation valve.

15. The system of claim 14 wherein the controller uses the estimated fuel cetane number to further adjust the target oxygen concentration value.

* * * * *